July 1, 1924.

J. L. DIBRELL 1,499,351

VEHICLE PULLING DEVICE

Filed Nov. 6, 1922

Inventor,
James L. Dibrell.

By Joshua R. H. Potts
Attorney

Patented July 1, 1924.

1,499,351

UNITED STATES PATENT OFFICE.

JAMES LAMBERT DIBRELL, OF LITTLE ROCK, ARKANSAS.

VEHICLE PULLING DEVICE.

Application filed November 6, 1922. Serial No. 599,239.

*To all whom it may concern:*

Be it known that I, JAMES L. DIBRELL, a citizen of the United States, residing at Little Rock, county of Pulaski, and State of Arkansas, have invented certain new and useful Improvements in Vehicle Pulling Devices, of which the following is a specification.

My invention relates to pulling devices and particularly to a device especially adapted for pulling automobiles or other vehicles from places where they have become stalled to places where they may proceed under their own power.

It frequently happens when traveling bad roads that an automobile or other vehicle will be mired, or become stalled on account of the bad roadway. The object of my invention is to provide a device by means of which the automobile or other vehicle may be readily pulled out of such positions, to the parts of the road where it may proceed under its own power. A further object of my invention is to provide a device of the character mentioned which may be readily carried in the vehicle and which may be quickly assembled for use. A further object of my invention is to provide a device of the class mentioned by means of which comparatively long pulls may be made by means of short pulling elements that may be readily carried in the tool box or under the seat of the vehicle. Other objects will appear hereinafter.

With these objects in view my invention consists generally in a body portion provided with means for securing the same in position on the roadway or elsewhere in advance of the vehicle, a traveling pulling member slidably mounted therein, means for moving said pulling member through the body portion, a chain equipped with means for attaching the same to a suitable part of the vehicle, and means for attaching the chain to the traveling member. My invention further consists in a device as mentioned in which the means for connecting the chain to the traveling member comprises a series of connected recesses in the traveling member extending longitudinally thereof throughout its length and into which the links of the chain are adapted to fit. My invention further consists in a device as mentioned in which the traveling pulling element comprises a plurality of similar sections which may be used singly for short pulls or successively for long pulls, as required. My invention further consists in various details of construction and arrangements of parts all as will be fully described hereinafter and particularly pointed out in the claims.

My invention will be more readily understood by reference to the accompanying drawings forming a part of this specification and in which—

Fig. 1 is a vertical longitudinal section of a pulling device embodying my invention in its preferred form, Fig. 2 is a plan view of the device, Fig. 3 is a detail view of the traveling pulling element, Fig. 4 is a transverse section on the line 4—4 of Fig. 3, Fig. 5 is a detail of a modified form of the pulling element, and Fig. 6 is a side elevation of the device illustrating the same in use.

Referring now to the drawings 1 indicates the body of the device which is preferably a hollow casting comprising parallel sides 2—2, a body 3 and transverse top members 4 and 5. The members 4—4 are arranged adjacent the ends of the casting, and with the adjacent portions and sides 2 and bottom 3 form sleeves or guides for a traveling pulling member 6. The pulling member 6 comprises a bar preferably rectangular in cross-section and formed on its upper face with ratchet teeth 7 which extend throughout the length of the device. These teeth are preferably indented leaving lateral smooth edges on the upper face to engage the members 4. Mounted to oscillate between the sides 2 is a lever 9 pivotally mounted on a transverse pin 10. Pivotally connected to the lever 9 is a dog 11 which normally engages the teeth 7. The lever 9 is provided at its upper end with a socket 12 to receive the end of the operating bar or handle 13, which constitutes an extension for the lever. It is obvious that by reciprocating the bar 13 and lever 9 that the member 6 will be moved through the body portion 1 with a step by step movement. To prevent a retraction of said member 6 between the strokes of the lever, I provide a pawl 14 pivotally mounted on a pin 15 between the sides 2—2. In order to be able to retract the member 6 when desired, the dog 11 is provided with a laterally projecting lug 16 extending through an aperture 17, and the pawl is provided with a similar lug 18 extending through an aperture 19. It is obvious that by means of these lugs the dog and pawl may be raised out of engagement with the traveling member after which the same is free to move in either direction.

In using the device, it is secured in position in advance of the vehicle and connected to the same by flexible elements secured both to the vehicle and to the traveling pulling element 6. In the modified form shown in Fig. 5, the member 6 is provided at one end with a hook 20 to which a cable or chain may be readily attached, the other end being secured to the vehicle. However, I prefer the form illustrated in the other figures of the drawings wherein the member 6 is provided in its under face with a series of recesses 21 adapted to receive horizontally disposed links of a chain and connected by narrow recesses 22 to receive the vertically disposed links. These recesses are deep enough to receive the entire links, and the bottom plate 3 of the body portion 1 maintains the links therein. 23 indicates the chain. The chain may be connected directly to the vehicle or may be connected to the same by a cable or rope 24.

In order that the device may be packed into small space in the vehicle and at the same time be adapted for a pull equal to the length of the chain without moving the body portion, I form the traveling member in sections, 6'—6" each of which is but slightly longer than the body 1. As the end of one section is drawn within the body, another section may be abutted against said end and the chain positioned in the recesses; and it is obvious that this section will be fed through the body as if integral with the preceding section. Ordinarily, two sections are all that is necessary; for as one section is ejected from one end of the body portion it may be returned and refed through the opposite end. To insure a more perfect integral action of the several sections, I preferably provide the ends with tongue and groove connections 25.

For securing the device to the roadway, or elsewhere, short lengths of chain 26—26 are connected to opposite sides of the body 1 and these chains are provided at their ends with enlarged links 27 to receive stakes 28. Preferably, the chains 26 are provided intermediate their ends with enlarged links 29 to receive additional stakes 30 when necessary. The end of the detachable bar or handle 13 is provided with the claw 31 to facilitate removing the stakes 28 and 30.

I claim:

1. A vehicle pulling device comprising a body portion, means for securing the same in position, a pulling element slidably mounted in said body portion and provided with a series of link receiving recesses, means for moving said pulling element through said body portion, a chain the links of which are adapted to enter said recesses and means for attaching said chain to a vehicle, substantially as described.

2. A device as set forth in claim 1, in which said pulling element comprises a bar provided with a series of connected link receiving recesses extending longitudinally thereof, substantially as described.

3. A device as set forth in claim 1 in which the pulling element comprises a bar provided with a series of connected link receiving recesses extending longitudinally thereof and in which a portion of said body constitutes means for maintaining the chain links in said recesses, substantially as described.

4. A device as set forth in claim 1 in which said pulling element comprises a bar provided with a series of connected link receiving recesses extending longitudinally thereof, said bar being formed of a plurality of similar sections adapted to be fed alternately and successively through the body portion, substantially as described.

5. A device as set forth in claim 1 in which said pulling element comprises a bar provided with a series of connected link receiving recesses extending longitudinally thereof, said bar being formed of a plurality of similar sections adapted to be fed alternately and successively through the body portion, said sections being provided with jointed ends, substantially as described.

6. A vehicle pulling device, comprising a body consisting of a bottom plate and parallel sides and transverse top members adjacent the ends forming spaced guides, in combination with a traveling pulling member slidably mounted in said guides, a reciprocating lever pivotally mounted between said sides, a ratchet connection between said lever and pulling member, the bottom of said pulling member being formed with a series of link receiving recesses, a chain having links adapted to fit within said recesses and means for connecting said chain to a vehicle, substantially as described.

7. A device as set forth in claim 6 in which said link receiving recesses are of sufficient depth to receive the entire links and of which the bottom of said body comprises means for maintaining the links within said recesses, substantially as described.

8. A vehicle pulling device comprising a body portion, means for securing the same in operative position, a pulling member mounted in said body portion, a reciprocating lever on said body portion, and operative connection between said lever and said pulling member, means for connecting said pulling element to a vehicle, said lever including a detachable handle equipped at one end with means for removing said securing means, substantially as described.

In testimony whereof I have signed my name to this specification in the presence of two subscribing witnesses.

JAMES LAMBERT DIBRELL.

Witnesses:
T. E. HELM,
H. W. TRIGG, Jr.